(12) United States Patent
Chen

(10) Patent No.: US 9,071,769 B2
(45) Date of Patent: Jun. 30, 2015

(54) METHOD AND APPARATUS FOR DETERMINING TYPE OF VIDEO SIGNAL TO BE OUTPUT

(71) Applicant: Huawei Device Co., Ltd., Shenzhen, Guangdong (CN)

(72) Inventor: Juntao Chen, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/732,051

(22) Filed: Dec. 31, 2012

(65) Prior Publication Data

US 2013/0113994 A1     May 9, 2013

Related U.S. Application Data

(63) Continuation of application No. PCT/CN2011/075871, filed on Jun. 17, 2011.

(51) Int. Cl.
*H04N 3/27* (2006.01)
*H04N 9/64* (2006.01)

(52) U.S. Cl.
CPC . *H04N 3/27* (2013.01); *H04N 9/641* (2013.01)

(58) Field of Classification Search
USPC .......................... 348/554–558, 705, 706, 180
See application file for complete search history.

(56) References Cited

U.S. PATENT DOCUMENTS

| | | | |
|---|---|---|---|
| 7,283,178 B2 * | 10/2007 | Dahlseid et al. | 348/553 |
| 7,515,208 B1 | 4/2009 | Young et al. | |
| 7,812,888 B2 | 10/2010 | Kataoka | |
| 8,045,058 B2 | 10/2011 | Jang | |

(Continued)

FOREIGN PATENT DOCUMENTS

| | | |
|---|---|---|
| CN | 1640152 A | 7/2005 |
| CN | 1960436 A | 5/2007 |

(Continued)

OTHER PUBLICATIONS

Communication from a foreign counterpart application, Chinese PCT Application No. PCT/CN2011/075871, International Search Report dated Mar. 15, 2012, 3 pages.

(Continued)

*Primary Examiner* — Jefferey Harold
*Assistant Examiner* — Humam Satti
(74) *Attorney, Agent, or Firm* — Conley Rose, P.C.; Grant Rodolph; Nicholas K. Beaulieu

(57) ABSTRACT

A method for determining a type of video signal to be output is provided. The method includes: respectively extracting detection signals in video signals in different video output interface modes; respectively converting the extracted detection signal into a direct current voltage signal; and respectively comparing the direct current voltage signal with a voltage threshold, and determining, according to a comparison result, a type of video signal to be output. An embodiment further provides an apparatus for determining a type of video signal to be output. The embodiments of the present invention, by respectively extracting a detection signal included in a video signal in each video output interface mode, and comparing a voltage of the detection signal with a voltage threshold, determine whether a corresponding DAC port in the each video output interface mode is connected to a load terminal, and thereby determine a video signal to be output.

9 Claims, 3 Drawing Sheets

(56) References Cited

U.S. PATENT DOCUMENTS

| | | | |
|---|---|---|---|
| 8,184,028 B2 * | 5/2012 | Tsai | 341/144 |
| 8,325,236 B2 * | 12/2012 | Hallberg | 348/180 |
| 2005/0140826 A1 | 6/2005 | Dumont et al. | |
| 2005/0177653 A1 * | 8/2005 | Chiu | 710/15 |
| 2006/0158568 A1 * | 7/2006 | Kaylani et al. | 348/725 |
| 2006/0282793 A1 | 12/2006 | Stephens et al. | 715/810 |
| 2007/0126930 A1 | 6/2007 | Jang | |
| 2007/0153132 A1 * | 7/2007 | Jong | 348/705 |
| 2007/0268413 A1 | 11/2007 | King | |
| 2008/0062328 A1 * | 3/2008 | Bilbrey | 348/705 |
| 2008/0088742 A1 * | 4/2008 | Li et al. | 348/572 |
| 2008/0158422 A1 * | 7/2008 | Chua et al. | 348/558 |
| 2008/0282793 A1 * | 11/2008 | Jirskog | 73/292 |
| 2009/0040387 A1 * | 2/2009 | Chao et al. | 348/613 |
| 2009/0086104 A1 * | 4/2009 | Felder | 348/705 |
| 2009/0158066 A1 | 6/2009 | Steinbusch et al. | |
| 2009/0174816 A1 * | 7/2009 | Hellman et al. | 348/553 |
| 2009/0204731 A1 * | 8/2009 | Mulligan et al. | 710/20 |
| 2009/0224866 A1 * | 9/2009 | Glen et al. | 340/3.43 |
| 2010/0128179 A1 * | 5/2010 | Jeon et al. | 348/558 |
| 2011/0157372 A1 * | 6/2011 | Liu et al. | 348/180 |
| 2012/0013807 A1 * | 1/2012 | Arora et al. | 348/705 |

FOREIGN PATENT DOCUMENTS

| | | |
|---|---|---|
| CN | 1976420 A | 6/2007 |
| CN | 101116347 A | 1/2008 |
| CN | 101595721 A | 12/2009 |
| JP | 2007096875 A | 4/2007 |
| WO | 2006083249 A1 | 8/2006 |

OTHER PUBLICATIONS

Foreign Communication From a Counterpart Application, Chinese Application 201180000876.0, Chinese Office Action dated Sep. 18, 2012, 7 pages.

Foreign Communication From a Counterpart Application, Chinese Application 201180000876.0, English Translation of Chinese Office Action dated Sep. 18, 2012, 4 pages.

Foreign Communication From a Counterpart Application, European Application No. 11789256.2, Extended European Search Report dated Aug. 4, 2014, 8 pages.

* cited by examiner

METHOD AND APPARATUS FOR DETERMINING TYPE OF VIDEO SIGNAL TO BE OUTPUT

CROSS-REFERENCE TO RELATED APPLICATION

This application is a continuation of International Patent Application No. PCT/CN2011/075871, filed on Jun. 17, 2011, which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to a video output technology field, and in particular to a method and an apparatus for determining a type of video signal to be output.

BACKGROUND

Common video output interfaces include a YPbPr interface (e.g., a color difference component interface, which is divided into three channels that respectively transmit a Y signal (luminance signal), a Pb signal (analog component blue color difference signal), and a Pr signal (analog component red color difference signal)), a YC interface (e.g., an S-Video interface (luminance separation interface), which is divided into two channels that respectively transmit a Y signal (luminance signal) and a C signal (color signal)), and a CVBS (composite video broadcast signal) interface. The YPbPr interface needs three video digital-to-analog converters (DACs) to respectively transmit the Y signal, Pb signal, and Pr signal, the YC interface needs two video DACs to respectively transmit the Y signal and C signal, and the CVBS interface needs one video DAC to transmit the CVBS signal.

To lower the cost and power consumption, the number of video DAC ports provided externally by a main chip of an existing set-top box is reduced from 6 originally to 3 or 4. To use 3 or 4 video DAC ports to implement the three video output interface modes, the set-top box needs to know a type of a required video signal to help dynamically adjust the output signal format of the video DAC, implementing the corresponding video output interface mode. In the prior art, the type of video signal to be output may be known in the following two ways:

(1) The YPbPr interface mode, YC interface mode, and CVBS interface mode are configured in the set-top box. A user controls the set-top box through a control panel or remote control to switch between the three interface modes, selects the video output interface mode that matches the currently connected television load terminal, and thereby notifies the set-top box through the control panel or remote control of the type of video signal to be output. However, this implementation method requires participation and operation of the user, and has the drawback of failing to automatically identify the type of video signal to be output, lowering service quality for the user.

(2) The set-top box uses a customized terminal socket. This socket has an embedded identification pin. The one or multiple video DAC ports that are connected to the load terminal are identified through this pin, and thereby the type of video signal corresponding to the required video output interface mode is known. The disadvantage of this implementation way is that the design structure of the terminal socket is complicated, and the hardware implementation cost is high.

SUMMARY

Embodiments of the present invention provide a method and an apparatus for determining a type of video signal to be output, thereby implementing automatic identification of a type of video signal to be output without requiring a user to participate in determination of the type of video signal to be output and without requiring the use of high-cost hardware with a complicated structure.

The purpose of the present invention is implemented through the following technical solutions:

A method for determining a type of video signal to be output, including: respectively extracting detection signals in video signals in different video output interface modes; respectively converting the extracted detection signals into direct current voltage signals; respectively comparing the direct current voltage signals with a voltage threshold; and determining, according to a comparison result, a type of video signal to be output.

An apparatus for determining a type of video signal to be output, including: a detection signal extracting module configured to: respectively extract detection signals in video signals in different video output interface modes, where the detection signals have different constant voltage values before and after a corresponding DAC port is connected to a load; a converting module configured to respectively convert the extracted detection signals into direct current voltage signals; a voltage comparing module configured to respectively compare the direct current voltage signals with a voltage threshold; and a result determining module configured to determine, according to a comparison result, a type of video signal to be output.

It may be seen from the technical solutions provided in the embodiments of the present invention that, in these embodiments, by extracting detection signals included in video signals in each video output interface mode, and comparing a voltage of the detection signals with a voltage threshold, it is determined whether a corresponding DAC port in each video output interface mode is connected to a load terminal, and thereby a type of video signal to be output is determined. When it is determined whether the load terminal is connected, only voltage comparison is performed to implement the determination. The implementation structure of a voltage comparator is simple and the hardware cost is low. Therefore, the embodiments of the present invention provide a low-cost technical solution that is easy to implement, and such solution automatically identifies a type of video signal to be output.

BRIEF DESCRIPTION OF THE DRAWINGS

To make the technical solution of the present invention clearer, the accompanying drawings for illustrating the embodiments of the present invention or the prior art are described below. Apparently, the accompanying drawings are for the exemplary purpose only, and a person skilled in the art may derive other drawings from such accompanying drawings without any creative effort.

DETAILED DESCRIPTION

The technical solution under the present invention is described below with reference to the accompanying drawings. Evidently, the embodiments described below are for the exemplary purpose only, without covering all embodiments of the present invention. Those skilled in the art are able to derive other embodiments from the embodiments given herein without making any creative effort, and all such embodiments are covered in the protection scope of the present invention.

Figure 1:
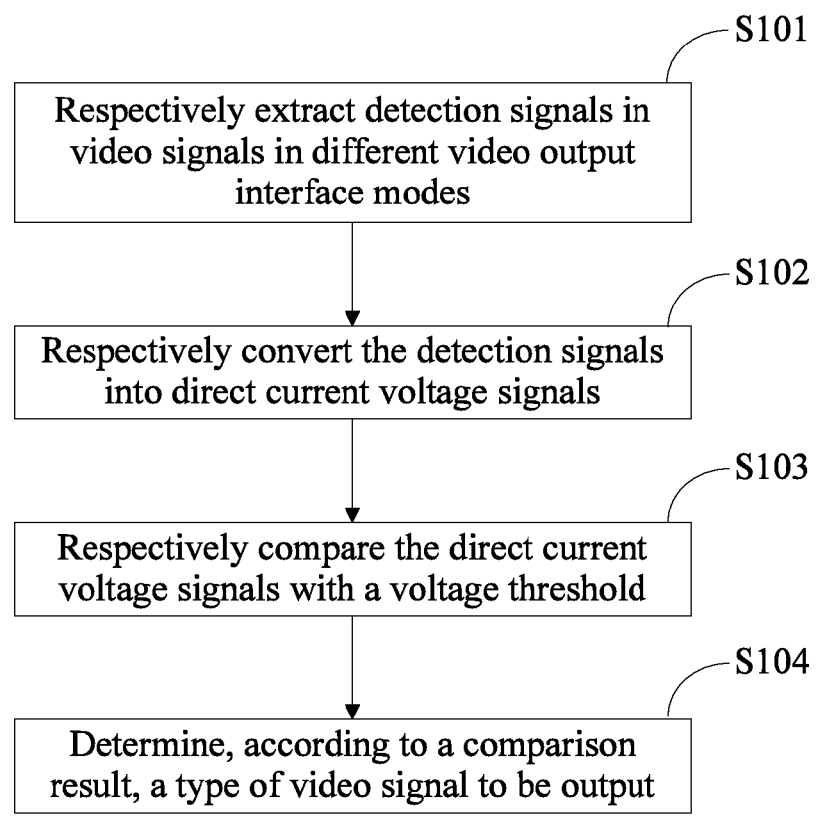
FIG. 1 is a flowchart of a method according to an embodiment of the present invention.

In a set-top box that provides less than 6 DAC ports (e.g., 3 or 4 DAC ports), to implement the function that the set-top box automatically identifies a video signal to be output so that the DAC ports are configured as the video output interface mode corresponding to the video signal to be output, an embodiment of the present invention provides a method for determining a type of video signal to be output. The implementation way is shown in FIG. 1. The method includes the following operations:

S101: Respectively extract detection signals in video signals in different video output interface modes, where the detection signal may be a synchronization header signal, a horizontal blanking signal, and so on.

The specific implementation way of S101 may be but is not limited to be: configuring a DAC port on the set-top box to one of different output modes each time, where an output mode may be a single video output interface mode or a combination of multiple video output interface modes; and respectively extracting the detection signals from video signals that are output in each corresponding video output interface mode.

S102: Respectively convert the extracted detection signals into direct current voltage signals.

S103: Respectively compare the direct current voltage signals with a voltage threshold.

S104: Determine, according to a comparison result, a type of video signal to be output.

The specific implementation way of S104 may be but is not limited to be: by querying pre-configured correspondence between a comparison result and a type of video signal, determining the type of video signal to be output that is corresponding to a comparison result generated in S103, where the comparison result is configured to indicate whether the DAC port corresponding to the detection signals is connected to a load terminal in the corresponding video output interface mode.

In the embodiments of the present invention, the video output interface modes may include but is not limited to: a YPbPr interface mode, a YC interface mode, and a CVBS interface mode.

Accordingly, the type of video signal to be output means that: if three DAC ports that output a Y signal, a Pb signal, and a Pr signal are all connected to the load terminal, it indicates that the type of video signal to be output is a YPbPr signal; if two DAC ports that output a Y signal and a C signal are connected to the load terminal, it indicates that the type of video signal to be output is a YC signal; if a DAC port that outputs a CVBS signal is connected to the load terminal, it indicates that the type of video signal to be output is a CVBS signal.

In the method provided in this embodiment, by extracting detection signals included in video signals in each video output interface mode, and comparing a voltage of the detection signals with a voltage threshold, whether a corresponding DAC port in the each video output interface mode is connected to a load terminal is determined, and thereby a type of video signal to be output is determined. When it is determined whether the load terminal is connected, only voltage comparison is performed to implement the determination. The implementation structure of a voltage comparator is simple and the hardware cost is low. Therefore, the embodiments of the present invention provide a low-cost technical solution that is easy to implement, and such solution automatically identifies a type of video signal to be output.

The following describes the specific implementation modes in actual applications of this embodiment in detail.

When a DAC port on the set-top box is not connected to the load terminal on a television set, the voltage amplitude of the video signal output by the DAC port is 2 Volts peak-to-peak (Vpp); when the DAC port on the set-top box is connected to the load terminal on the television set, the 75 ohm resistor at the video output end of the set-top box shares the voltage with the 75 ohm load inside the television set, and the voltage amplitude of the video signal output by the DAC port is reduced to 1 Vpp.

Because the image content of a television picture is different, the video signal amplitude changes constantly. The following takes the video signal voltage output by the DAC port after being connected to the load terminal for example: When the television picture is a pure white image, the maximum voltage of the video signal output by the DAC port is 700 millivolts (mV), and the corresponding voltage amplitude of the video signal is 1 Vpp×(300 mV+700 mV); when the television picture is a pure black image, the minimum voltage the video signal output by the DAC port is 0 mV, the corresponding voltage of the video signal is 300 mV, and the corresponding voltage amplitude of the video signal is 1 Vpp×300 mV. It should be noted that, in the output video signal, a signal that is not affected by the image content is included. In this embodiment, this signal is called a detection signal. A feature of the detection signal is that the detection signal has different constant voltage values before and after the DAC port is connected to a load terminal. The following two cases are taken as examples which are not restrictions. (1) This detection signal may be a synchronization header signal: when the DAC port is not connected to the load terminal, the voltage value of the synchronization header signal in the output video signal is 600 mV and constant; after the DAC port is connected to the load terminal, the voltage value of the synchronization header signal in the output video signal is 300 mV and constant. (2) The detection signal may further be a horizontal blanking signal of the video signal. The horizontal blanking signal of the video signal does not require transmission of a television image signal. Therefore, as a special video signal, the horizontal blanking signal includes a synchronization header signal and a desired signal, and the voltage value of the desired signal part is 0, that is, it also has different constant voltage values before and after the DAC port is connected to the load terminal.

In order to learn whether the DAC port is connected to the load terminal, only the detection signals need to be extracted from the video signals through a detection signal extracting apparatus, and the voltage value of the detection signal needs to be compared with the voltage threshold.

If the detection signals are synchronization header signals, an existing synchronization header separator may be used to extract the synchronization header signals; if the detection signals are horizontal blanking signals of the video signal, an existing technology for extracting horizontal blanking signals may be used to extract the horizontal blanking signals.

Figure 2:
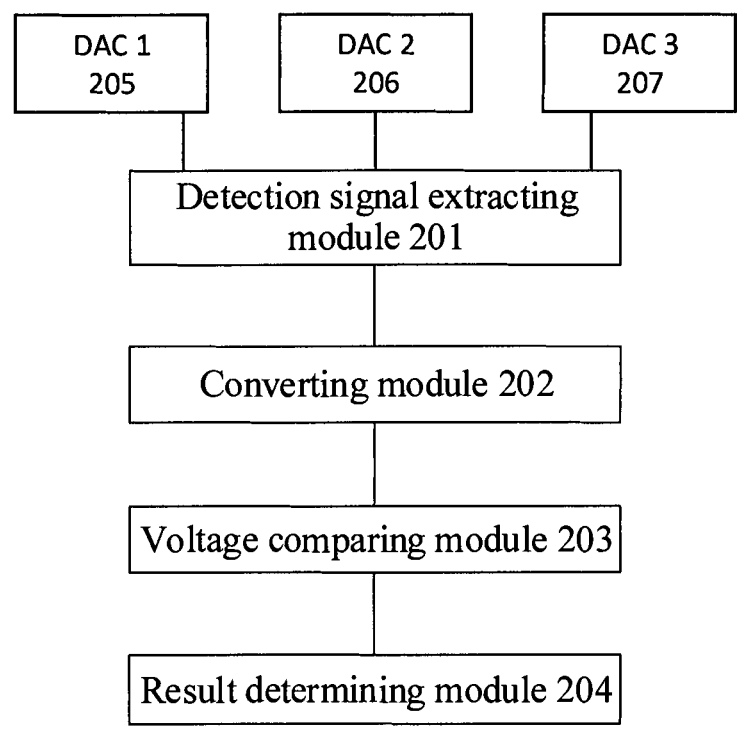
FIG. 2 shows a structure of an apparatus according to an embodiment of the present invention.

In an application embodiment, the chip of the set-top box provides 3 DAC ports (i.e., DAC 1 205, DAC 2 206, and DAC 3 207 shown in FIG. 2). To implement multiple video output interface modes by using the 3 DAC ports, and to enable that the type of video signal that is to be output may be automatically determined, different output modes may be pre-configured, where each output mode may implement one or multiple video output interface modes. As examples but not restrictions, two output modes may be configured according to table 1.

TABLE 1

| Category | DAC1 | DAC2 | DAC3 |
|---|---|---|---|
| A | C | Y | CVBS |
| B | Pr | Y | Pb |

As described in table 1, in group A output mode, DAC 1 and DAC 2 implement the YC interface mode (where the video signal output by DAC 1 is a C signal, and the video signal output by DAC 2 is a Y signal), and DAC 3 implements the CVBS interface mode (where the video signal output by DAC 3 is a CVBS signal); in group B output mode, the YPbPr interface mode is implemented (where the video signal output by DAC 1 is a Pr signal, the video signal output by DAC 2 is a Y signal, and the video signal output by DAC 3 is a Pb signal).

In order to acquire detection signals in different video output interface modes, the video signals output by DAC 1, DAC 2, and DAC 3 may be respectively monitored. However, in the CVBS interface mode, the CVBS signal includes a synchronization header signal; in the YC interface mode and YPbPr interface mode, only the Y signal includes the synchronization header signal. Therefore, in this embodiment, only the video signals output by DAC 1 and DAC 2 are monitored so that the detection mode in each video output interface mode may be obtained. Accordingly, operations for using the method provided in this embodiment to determine the type of video signal to be output are as follows:

S201: Start a judgment operation, which may be specifically executed after the set-top box is started.

S202: Configure the DAC ports as the group A mode.

The S201 and S202 may be executed by a control unit of the set-top box or by a separate control apparatus.

S203: In the group A mode, respectively extract synchronization header signals in video signals output by DAC 2 and DAC 3.

The step S203 may be executed by two synchronization header separators respectively connected to the DAC 2 port and the DAC 3 port.

S204: Respectively convert the synchronization header signals extracted from the Y signal and the synchronization header signals extracted from the CVBS signal into direct current voltage signals.

The S204 may be executed by an integrator. Specifically, it may be respectively executed by two integrators respectively connected to the two synchronization header separators. Alternatively, an integration amplifier may further be used to convert synchronization header signals into amplified direct current voltage signals.

S205: Respectively compare the direct current voltage signals with the voltage threshold.

The S205 may be executed by a voltage comparator circuit. Specifically, it may be executed by two voltage comparator circuits respectively connected to the two integrators. Where, if the direct current voltage signals are original voltage signals (e.g., signals that are not amplified), the value range for the voltage threshold provided by the voltage comparator circuit is 30 mV±5 mV; if the direct current voltage signals are amplified direct current voltage signals, the value range for the voltage threshold provided by the voltage comparator circuit is multiplication of 30 mV±5 mV by the same times.

S206: Record a comparison result.

Where, with DAC 2 being taken as an example, the specific implementation way of S206 may be but is not limited to be: if the comparison result shows that the direct current voltage corresponding to a synchronization header signal is lower than the voltage threshold, no load terminal is connected to the DAC 2, and the comparison result is set and recorded as "0"; if the comparison result shows that the direct current voltage corresponding to a synchronization header signal is larger than the voltage threshold, a load terminal is connected to the DAC 2, and the comparison result is set and recorded as "1."

S207: Configure the DAC ports as the group B mode.

The S206 and S207 may be executed by a control unit of the set-top box or by a separate control apparatus.

S208: In the group B mode, extract the synchronization header signals in the video signal output by the DAC 2, where the output video signal is monitored in the DAC 3, but the extracted signal voltage value is 0 because the Pb signal does not include a synchronization header signal.

The S208 may be executed by two synchronization header separators respectively connected to the DAC 2 port and the DAC 3 port.

S209: Respectively convert the synchronization header signals extracted from the Y signal and the signals extracted from the Pb signal into direct current voltage signals.

The S209 may be executed by an integrator. Specifically, it may be respectively executed by two integrators respectively connected to the two synchronization header separators. Alternatively, an integration amplifier may further be used to convert synchronization header signals into amplified direct current voltage signals.

S210: Respectively compare the two direct current voltage signals after conversion with the voltage threshold.

The S210 may be executed by a voltage comparator circuit. Specifically, it may be executed by two voltage comparator circuits respectively connected to the two integrators. If the direct current voltage signals are original voltage signals (e.g., signals that are not amplified), the value range for the voltage threshold provided by the voltage comparator circuit is 30 mV±5 mV; if the direct current voltage signals are amplified direct current voltage signals, the value range for the voltage threshold provided by the voltage comparator circuit is multiplication of 30 mV±5 mV by the same times.

S211: Record a comparison result.

S212: In each DAC, respectively perform an "OR" operation for two groups of extracting results to obtain a final comparison result.

The specific implementation way is: performing the "OR" operation for the comparison result corresponding to the DAC 2 in the group A and the comparison result corresponding to the DAC 2 in the group B, and performing the "OR" operation for the comparison result corresponding to the DAC 3 in the group A and the comparison result corresponding to the DAC 3 in the group B to obtain the final comparison result. For example, in the group A, the comparison result of the DAC 2 is 0, and the comparison result of the DAC 3 is 1; in the group B, the comparison result of the DAC 2 is 0, and the comparison result of the DAC 3 is 0. Then, the final comparison result is: the comparison result corresponding to the DAC 2 is 0, and the comparison result corresponding to the DAC 3 is 1.

S213: By querying pre-configured correspondence between the comparison result and the type of video signal, determine the type of video signal to be output corresponding to the final comparison result.

Where, the correspondence between the comparison result and the type of video signal is determined according to the pre-configured output mode. Its specific implementation way is able to be directly and uniquely deduced by those skilled in the art without creative work after determining the output mode.

In this application embodiment, if the final comparison results of the DAC 2 and DAC 3 are both 0, it indicates that no load terminal is connected to the DAC 2 port or the DAC 3 port. In this case, the video signal does not need to be output or may be output by using the group A configuration as the default output mode. If the final comparison result of the DAC 2 is 0, but the final comparison result of the DAC 3 is 1, it indicates that the DAC 2 port is not connected to the load terminal either in the group A configuration or in the group B configuration, but the DAC 3 port is connected to the load terminal either in the group A configuration or in the group B configuration, that is, the video signal to be output is the CVBS signal, and the required output mode is the group A configuration. If the final comparison result of the DAC 2 is 1, but the final comparison result of the DAC 3 is 0, it indicates that the DAC 3 port is not connected to the load terminal either in the group A configuration or in the group B configuration, but the DAC 2 port is connected to the load terminal either in the group A configuration or in the group B configuration. Because the DAC 3 port is not connected to the load terminal, it is able to be determined that the video signal to be output is the YC signal, and the required output mode is the group A configuration. If the final comparison results of the DAC 2 and the DAC 3 are both 1, the DAC 2 port and the DAC 3 port are both connected to the load terminal. As a television set is unable to receive video signals of two types at the same time, it is able to be determined that the video signal to be output is the YPbPr signal, and the required output mode is the group B configuration. Therefore, according to the pre-configured output mode, the correspondence between the comparison result and the type of video signal is as described in table 2.

TABLE 2

| DAC2 | DAC3 | Required output mode |
|---|---|---|
| 0 | 0 | A |
| 0 | 1 | A |
| 1 | 0 | A |
| 1 | 1 | B |

In another application embodiment, the chip of the set-top box provides 3 DAC ports internally. To implement multiple video output interface modes by using the 3 DAC ports, and allow the type of video signal that is to be output to be automatically determined, different output modes may be pre-configured, where each output mode may implement one or multiple video output interface modes. As examples but not restrictions, two output modes may be configured according to table 3.

TABLE 3

| Category | DAC1 | DAC2 | DAC3 |
|---|---|---|---|
| A | C | Y | CVBS |
| B | Y | Pr | Pb |

As described in table 3, in the output mode in group A, DAC 1 and DAC 2 implement the YC interface mode (where the video signal output by DAC 1 is a C signal, and the video signal output by DAC 2 is a Y signal), and DAC 3 implements the CVBS interface mode (where the video signal output by DAC 3 is a CVBS signal); in the output mode in group B, the YPbPr interface mode is implemented (where the video signal output by DAC 1 is a Y signal, the video signal output by DAC 2 is a Pr signal, and the video signal output by DAC 3 is a Pb signal).

In order to acquire detection signals in different video output interface modes, the video signals output by the DAC 1, DAC 2, and DAC 3 are respectively monitored. Accordingly, operations for using the method provided in this embodiment to determine the type of video signal to be output are as follows:

S301: Start a judgment operation, which may be specifically executed after the set-top box is started.

S302: Configure the DAC ports as the group A mode.

S303: In the group A mode, respectively extract the synchronization header signals in the video signals output by the DAC 2 and DAC 3, where the output video signal is monitored in the DAC 1, but the extracted signal voltage value is 0 because the C signal does not include a synchronization header signal.

S304: Respectively convert the signals extracted from the C signal, the synchronization header signals extracted from the Y signal, and the synchronization header signals extracted from the CVBS signal into direct current voltage signals.

Alternatively, they may further be converted into amplified direct current voltage signals.

S305: Respectively compare the three direct current voltage signals after conversion with the voltage threshold.

Where, the value range of the voltage threshold is the same as in the previous application embodiment.

S306: Record a comparison result.

Where, with DAC 2 being taken as an example, the specific implementation way of S306 may be but is not limited to be: if the comparison result shows that the direct current voltage corresponding to synchronization header signals is lower than the voltage threshold, no load terminal is connected to the DAC 2, and the comparison result is set and recorded as "0"; if the comparison result shows that the direct current voltage corresponding to synchronization header signals is larger than the voltage threshold, a load terminal is connected to the DAC 2, and the comparison result is set and recorded as "1."

S307: Match the comparison result with the pre-configured correspondence between the comparison result and the type of video signal to determine the type of video signal to be output; if no matched result is found, go to S308.

S308: Configure the DAC ports as the group B mode.

S309: In the group B mode, extract the synchronization header signals in the video signal output by the DAC 1, where the output video signals are monitored in the DAC 2 and DAC 3, but the extracted signal voltage values are 0 because the Pb signal does not include a synchronization header signal.

S310: Respectively convert the synchronization header signals extracted from the Y signal and the signals extracted from the Pb and Pr signals into direct current voltage signals.

Alternatively, they may further be converted into amplified direct current voltage signals.

S311: Respectively compare the two direct current voltage signals after conversion with the voltage threshold, where the value range of the voltage threshold is the same as in the previous application embodiment.

S312: Record a comparison result.

S313: By querying the pre-configured correspondence between the comparison result and the type of video signal, determine the type of video signal to be output corresponding to the comparison result in S312.

Where, the correspondence between the comparison result and the type of video signal is determined according to the pre-configured output mode. Its specific implementation way is able to be directly and uniquely deduced by those skilled in the art without creative work after determining the output mode.

In this application embodiment, as the video signals that include the synchronization header signals are respectively configured in different DACs in the three video output interface modes, the correspondence between the comparison result and the type of video signal is described in table 4.

TABLE 4

| DAC1 | DAC2 | DAC3 | Required output mode |
|------|------|------|----------------------|
| 0    | 0    | 1    | A                    |
| 0    | 1    | 0    | A                    |
| 1    | 0    | 0    | B                    |

In addition to the output modes listed in the two application embodiments, other output modes may further exist. As in the other output modes the principle of determining the correspondence between the comparison result and the type of video signal is the same as that in the application embodiments, it is not described herein again.

Each of the preceding application embodiments has described in detail the method for how to determine the type of video signal to be output by taking the synchronization header signals as an example. As a special video signal, a horizontal blanking signal has the same voltage feature as a synchronization header signal. Therefore, if the video signal to be output is determined based on the horizontal blanking signal, its implementation way may refer to the preceding application embodiments, and is not described herein again.

All or part of the steps in the preceding method may be completed by using a program to instruct the hardware. The program may be stored in a storage medium that is able to be read by a computer. During execution, the program executes the steps of the preceding method. The storage medium includes all types of media, such as a read-only memory (ROM), a random-access memory (RAM), a magnetic disk, and a compact disk, which are able to store program codes.

An embodiment of the present invention further provides an apparatus for determining a type of video signal to be output. FIG. 2 shows its structure. The specific implementation structure is as follows a detection signal extracting module 201 configured to: respectively extract detection signals in video signals in different video output interface modes, where the detection signals have different constant voltage values before and after a corresponding DAC port is connected to a load.

The detection signal extracting module 201 is further configured to configure a DAC port to one of the different output modes each time, where the output modes are a single video output interface mode, or a combination of multiple video output interface modes, and extract the detection signals from video signals that are output in each corresponding video output interface mode.

The number of detection signal extracting modules 201 is the same as the number of DACs to be monitored, and they are respectively connected to the DAC ports (i.e., DAC 1 205, DAC 2 206, and DAC 3 207 shown in FIG. 2) to be monitored. A converting module 202 configured to convert the detection signals extracted by the detection signal extracting module 201 into direct current voltage signals, where the converting module 202 may be specifically implemented by an integrator. The number of converting modules 202 is the same as the number of detection signal extracting modules 201, and each of them is connected to each detection signal extracting module 201. A voltage comparing module 203 configured to respectively compare the direct current voltage signals with a voltage threshold; a number of voltage comparing modules 203 may be the same as the number of converting modules 202, and they are respectively connected to each converting module 202. A result determining module 204 configured to determine, according to a comparison result, a type of video signal to be output.

The result determining module 204 is specifically configured to: according to each comparison result, by querying pre-configured correspondence between the comparison result and the type of video signal, determine the type of video signal to be output, where the comparison result is configured to indicate whether a DAC port corresponding to the detection signals is connected to a load terminal in the corresponding video output interface mode.

In this embodiment, the result determining module 204 may be further configured to: when three DAC ports that output the Y signal, Pb signal, and Pr signal are all connected to the load terminal, determine that the type of video signal to be output is a YPbPr signal; or when two DAC ports that output the Y signal and C signal are connected to the load terminal, determine that the type of video signal to be output is a YC signal; or when a DAC port that outputs the CVBS signal is connected to the load terminal, determine that the type of video signal to be output is a CVBS signal.

Figure 3:
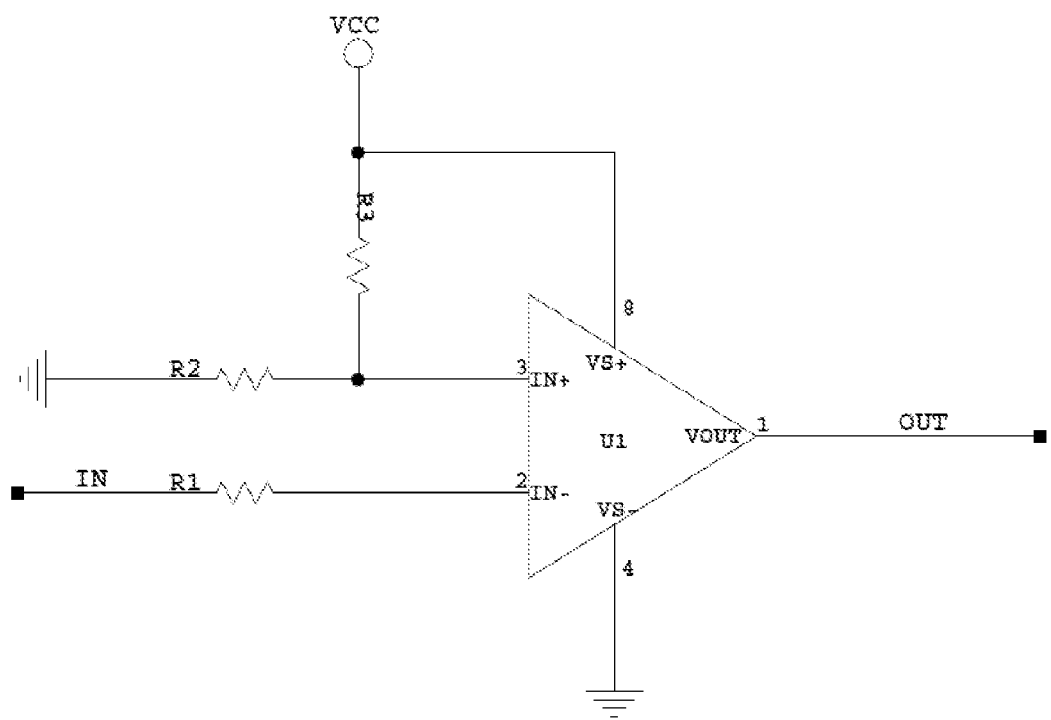
FIG. 3 is a schematic diagram of a voltage comparator circuit according to an embodiment of the present invention.

The voltage comparing module 203 specifically may be implemented by a voltage comparator circuit. FIG. 3 shows the structure of the voltage comparator circuit. Where, U1 is an operation amplifier that is configured to compare input signals of pin 3 and pin 2, and output a comparison result from pin 1; resistor R2 and resistor R3 are configured to implement the voltage threshold, their resistance precision is not lower than 1%, and the voltage threshold in this circuit is VCC×R3/(R2+R3), where VCC is a positive supply voltage, and where the value of resistor R1 may be the same as the value of resistor R2.

In conclusion, the above are merely exemplary embodiments of the present invention. However, the scope of the present invention is not limited thereto. Changes or replacements readily apparent to those skilled in the prior art within the technical scope of the present invention should fall within the protection scope of the present invention. Therefore, the protection scope of the present invention is subject to the appended claims.

What is claimed is:

1. A method for determining a type of video signal to be output comprising:

configuring different video output interface modes of a set-top box, wherein the set-top box comprises three digital-to-analog converter (DAC) ports, wherein one of the different video output interface modes uses the three DAC ports to output a luminance, blue color difference, and red color difference (YPbPr) video signal, and wherein another one of the different video output interface modes uses the same three DAC ports to simultaneously output a luminance and color (YC) video signal and a composite video broadcast signal (CVBS) video signal;

outputting a detection signal in the one of the different video output interface modes using one of the three DAC ports;

switching the set-top box from the one of the different video output interface modes to the another one of the different video output interface modes;

outputting additional detection signals in the another one of the different video output interface modes using two of the three DAC ports;

extracting the detection signal and the additional detection signals in the different video output interface modes, wherein the detection signal and the additional detection signals have different constant voltage values before and after a corresponding one of the three DAC ports is connected to a load;

converting the extracted detection signal and the extracted additional detection signals into direct current voltage signals;

comparing each of the direct current voltage signals with a voltage threshold to determine whether each of the direct current voltage signals is greater than or less than the voltage threshold;

determining the type of video signal to be output based at least in part on which one or more of the direct current voltage signals is greater than the voltage threshold;

recording a zero value for one of the three DAC ports when the direct current voltage signal is less than the voltage threshold;

recording a one value for the one of the three DAC ports when the direct current voltage signal is greater than the voltage threshold; and performing an "OR" on recorded one and zero values for each of the three DAC ports to determine the type of video signal to be output.

2. The method according to claim 1, wherein determining the type of video signal to be output comprises determining the type of video signal to be output by querying pre-configured correspondence between a comparison result and the type of video signal.

3. The method according to claim 1, wherein the detection signal and the additional detection signals are synchronization header signals or horizontal blanking signals.

4. An apparatus for determining a type of video signal to be output comprising:

three digital-to-analog converter (DAC) ports of a set-top box, wherein the set-top box comprises multiple different video interface modes, wherein one of the different video output interface modes uses the three DAC ports to output a luminance, blue color difference, and red color difference (YPbPr) video signal, wherein another one of the different video output interface modes uses the same three DAC ports to simultaneously output a luminance and color (YC) video signal and a composite video broadcast signal (CVBS) video signal, wherein a detection signal is output in the one of the different video output interface modes using one of the three DAC ports, wherein the set-top box is switched from the one of the different video output interface modes to the another one of the different video output interface modes, and wherein additional detection signals are output in the another one of the different video output interface modes using two of the three DAC ports;

a detection signal extracting module configured to extract the detection signal and the additional detection signals in the different video output interface modes, wherein the detection signal and the additional detection signals have different constant voltage values before and after a corresponding one of the three DAC ports is connected to a load;

a converting module configured to convert the extracted detection signal and the additional detection signals into direct current voltage signals;

a voltage comparing module configured to compare each of the direct current voltage signals with a voltage threshold to determine whether each of the direct current voltage signals is greater than or less than the voltage threshold; and a result determining module configured to determine a type of video signal to be output based at least in part on which one or more of the direct current voltage signals is greater than the voltage threshold, wherein the voltage comparing module is further configured to:
  record a zero value for one of the three DAC ports when the direct current voltage signal is less than the voltage threshold; and
  record a one value for the one of the three DAC ports when the direct current voltage signal is greater than the voltage threshold, and wherein the result determining module is further configured to perform an "OR" operation on recorded one and zero values for each of the three DAC ports to determine the type of video signal to be output.

5. The apparatus according to claim 4, wherein the result determining module is further configured to determine the type of video signal to be output by querying pre-configured correspondence between a comparison result and the type of video signal.

6. The method according to claim 1, wherein converting the extracted detection signal and the extracted additional detection signals into the direct current voltage signals comprises converting the extracted detection signal and the extracted additional detection signals into the direct current voltage signals with an integrator, and wherein the voltage threshold comprises 30+/−5 millivolts.

7. The method according to claim 1, wherein converting the extracted detection signal and the extracted additional detection signals into the direct current voltage signals comprises converting the extracted detection signal and the extracted additional detection signals into the direct current voltage signals with an integration amplifier, and wherein the voltage threshold comprises a multiple of 30+/−5 millivolts.

8. The apparatus according to claim 4, wherein the converting module is configured to convert the extracted detection signal and the extracted additional detection signals into the direct current voltage signals with an integrator, and wherein the voltage threshold comprises 30+/−5 millivolts.

9. The apparatus according to claim 4, wherein the converting module is configured to convert the extracted detection signal and the extracted additional detection signals into the direct current voltage signals with an integration amplifier, and wherein the voltage threshold comprises a multiple of 30+/−5 millivolts.

* * * * *